United States Patent
Kim et al.

(10) Patent No.: US 9,461,718 B2
(45) Date of Patent: Oct. 4, 2016

(54) METHOD FOR TRANSMITTING CHANNEL QUALITY INFORMATION, AND APPARATUS FOR SAME

(75) Inventors: Ki Jun Kim, Anyang-si (KR); Eun Sun Kim, Anyang-si (KR); Han Byul Seo, Anyang-si (KR); Hak Seong Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 188 days.

(21) Appl. No.: 13/508,346

(22) PCT Filed: Nov. 1, 2010

(86) PCT No.: PCT/KR2010/007594
§ 371 (c)(1),
(2), (4) Date: May 4, 2012

(87) PCT Pub. No.: WO2011/055940
PCT Pub. Date: May 12, 2011

(65) Prior Publication Data
US 2012/0218968 A1 Aug. 30, 2012

Related U.S. Application Data

(60) Provisional application No. 61/258,198, filed on Nov. 5, 2009, provisional application No. 61/381,050, filed on Sep. 8, 2010.

(51) Int. Cl.
*H04W 72/04* (2009.01)
*H04B 7/02* (2006.01)
*H04L 5/00* (2006.01)

(52) U.S. Cl.
CPC ............. *H04B 7/024* (2013.01); *H04L 5/0053* (2013.01); *H04B 7/022* (2013.01)

(58) Field of Classification Search
CPC ...... H04L 5/0053; H04B 7/024; H04B 7/022; H04W 72/04
USPC .......................................... 370/329
See application file for complete search history.

(56) References Cited

U.S. PATENT DOCUMENTS

| 8,665,763 B2 * | 3/2014 | Choi ................ H04W 52/143 370/252 |
| 2009/0052405 A1 * | 2/2009 | Ko .................... H04B 7/0417 370/335 |

(Continued)

FOREIGN PATENT DOCUMENTS

| KR | 10-2003-0077732 | 10/2003 |
| KR | 10-2005-0091582 | 9/2005 |

OTHER PUBLICATIONS

Qualcomm Europe, "Short-Term and Long-Term CSI in Support of Downlink CoMP," 3GPP TSG-RAN WG1 #58, R1-093111, Aug. 2009, 2 pages.

*Primary Examiner* — Andrew Chriss
*Assistant Examiner* — Rasha Fayed
(74) *Attorney, Agent, or Firm* — Lee Hong Degerman Kang & Waimey; Jonathan Kang; Jeffrey Lotspeich

(57) ABSTRACT

The present invention relates to a wireless communication system. In particular, the present invention relates to a method and apparatus for transmitting channel quality information using a terminal, wherein the method comprises the steps of: receiving CoMP configuration information from a serving transmission point; receiving a downlink signal from a plurality of transmission points; and transmitting channel quality information on one or more downlink sub-bands for each transmission point to the serving transmission point, wherein the plurality of transmission points select the same one or more downlink sub-bands in consideration of the CoMP configuration information.

6 Claims, 15 Drawing Sheets

(56) References Cited

U.S. PATENT DOCUMENTS

| | | | |
|---|---|---|---|
| 2009/0168718 A1* | 7/2009 | Wang | H04L 1/0026 370/330 |
| 2009/0225714 A1* | 9/2009 | Kim et al. | 370/329 |
| 2010/0002598 A1* | 1/2010 | Pan | H04B 7/063 370/252 |
| 2010/0110982 A1* | 5/2010 | Roh et al. | 370/328 |
| 2010/0303013 A1* | 12/2010 | Khandekar et al. | 370/328 |
| 2010/0322171 A1* | 12/2010 | Dekorsy | H04B 7/0621 370/329 |
| 2010/0322176 A1* | 12/2010 | Chen et al. | 370/329 |
| 2011/0007685 A1* | 1/2011 | Ma | H01Q 25/00 370/315 |
| 2011/0032839 A1* | 2/2011 | Chen et al. | 370/252 |
| 2011/0034175 A1* | 2/2011 | Fong | H04B 7/024 455/450 |
| 2011/0096734 A1* | 4/2011 | Damnjanovic et al. | 370/329 |
| 2011/0098054 A1* | 4/2011 | Gorokhov | H04B 7/024 455/452.1 |
| 2011/0222525 A1* | 9/2011 | Kishigami et al. | 370/343 |
| 2011/0269459 A1* | 11/2011 | Koo et al. | 455/434 |

* cited by examiner

FIG. 14

| Subband index | 0 | 1 | 2 | 3 | 4 | 5 | 6 | 7 | 8 |
|---|---|---|---|---|---|---|---|---|---|
| Cell 1 | $a_0$ | $a_1$ | $a_2$ | $a_3$ | $a_4$ | $a_5$ | $a_6$ | $a_7$ | $a_8$ |
| Cell 2 | $b_0$ | $b_1$ | $b_2$ | $b_3$ | $b_4$ | $b_5$ | $b_6$ | $b_7$ | $b_8$ |
| Cell 3 | $c_0$ | $c_1$ | $c_2$ | $c_3$ | $c_4$ | $c_5$ | $c_6$ | $c_7$ | $c_8$ |

 Cell-common best M-subband(s) considering temporary CoMP configuration information Case 1: Data transmission point – cell 1 and beam avoidance point – cell 2 and cell 3

- Subband optimized for receiving signal of cell 1 is selected as the cell-common best M-subband(s).

Case 2: Data transmission point – cell 1 and cell 2; beam avoidance point – cell 3

- Subband optimized for receiving signals of cell 1 and cell 2 is selected as the cell-common best M-subband(s).

Case 3: Data transmission point – cell 1 to cell 3

- Subband optimized for receiving signals of cell 1 to cell 3 is selected as the cell-common best M-subband(s).

 Per-cell reporting

- Reporting of channel quality for cell 1: a1, a4, a8
- Reporting of channel quality for cell 2: b1, b4, b8
- Reporting of channel quality for cell 3: c1, c4, c8

METHOD FOR TRANSMITTING CHANNEL QUALITY INFORMATION, AND APPARATUS FOR SAME

CROSS-REFERENCE TO RELATED APPLICATIONS

This application is the National Stage filing under 35 U.S.C. 371 of International Application No. PCT/KR2010/007594, filed on Nov. 1, 2010, which claims the benefit of U.S. Provisional Application Ser. Nos. 61/381,050, filed on Sep. 8, 2010, and 61/258,198, filed on Nov. 5, 2009, the contents of which are all incorporated by reference herein in their entirety.

TECHNICAL FIELD

The present invention relates to wireless communication system, and more particularly to a method for transmitting channel quality information and an apparatus for the same.

BACKGROUND ART

A wireless communication system has been widely developed to provide various kinds of communication services such as voice and data. Generally, the wireless communication system is a multiple access system that can support communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

Accordingly, an object of the present invention devised to solve the conventional problem is to provide a method for transmitting channel quality information and an apparatus for the same. More specifically, the present invention is intended to provide a method for efficiently transmitting channel quality information on a downlink in a coordinated multiple point transmission and reception (CoMP) system and an apparatus for the same.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To solve the aforementioned technical problems, according to one aspect of the present invention, a method for transmitting channel quality information from a user equipment in a wireless communication system that supports coordinated multiple point transmission and reception (CoMP) comprises the steps of receiving CoMP configuration information from a serving transmission point; receiving a downlink signal from a plurality of transmission points; and transmitting channel quality information on one or more downlink subbands per transmission point to the serving transmission point, wherein the one or more downlink subbands are selected equally for the plurality of transmission points by considering the CoMP configuration information.

In another aspect of the present invention, a user equipment configured to transmit channel quality information in a wireless communication system that supports coordinated multiple point transmission and reception (CoMP) comprises a radio frequency (RF) unit; and a processor receiving CoMP configuration information from a serving transmission point, receiving a downlink signal from a plurality of transmission points, and transmitting channel quality information on one or more downlink subbands per transmission point to the serving transmission point, wherein the one or more downlink subbands are selected equally for the plurality of transmission points by considering the CoMP configuration information.

In this case, the CoMP configuration information may include CoMP mode information indicating dynamic cell selection (DCS), joint processing (JP), or cooperative scheduling/cooperative beamforming (CS/CB), and the one or more downlink subbands may be selected considering the CoMP mode information.

The CoMP configuration information may include a flag field indicating action of the transmission point, and the one or more downlink subbands may be selected considering a value of the flag field.

If the value of the flag field indicates a data transmission point, a downlink signal of the corresponding transmission point may be regarded as an effective signal during the step of selecting the one or more downlink subbands, and if the value of the flag field indicates a beam avoidance point, a downlink signal of the corresponding transmission point may be regarded as noise or interference during the step of selecting the one or more downlink subbands.

The flag field may include 1-bit information indicating whether the corresponding transmission point is a data transmission point or a beam avoidance point.

The serving transmission point may previously be set to the data transmission point, and the flag field may be set for a neighboring transmission point only.

Advantageous Effects

According to the embodiments of the present invention, uplink control information can efficiently be transmitted from a wireless communication system. In more detail, control information related to a downlink channel can efficiently be transmitted from a CoMP system.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 13 and 14 are diagrams illustrating per-cell reporting schemes according to the embodiment of the present invention.

BEST MODE FOR CARRYING OUT THE INVENTION

The following technology may be used for various wireless access systems such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as universal terrestrial radio access (UTRA) or CDMA2000. The TDMA may be implemented by the radio technology such as global system for mobile communications (GSM)/ general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A $3^{rd}$ generation partnership project long term evolution (3GPP LTE) communication system is a part of an evolved UMTS (E-UMTS) that uses E-UTRA, and uses OFDMA in a downlink while uses SC-FDMA in an uplink. LTE-advanced (LTE-A) is an evolved version of the 3GPP LTE.

Although the following description will be based on the 3GPP LTE/LTE-A to clarify description, it is to be understood that technical spirits of the present invention are not limited to the 3GPP LTE/LTE-A.

Figure 1:
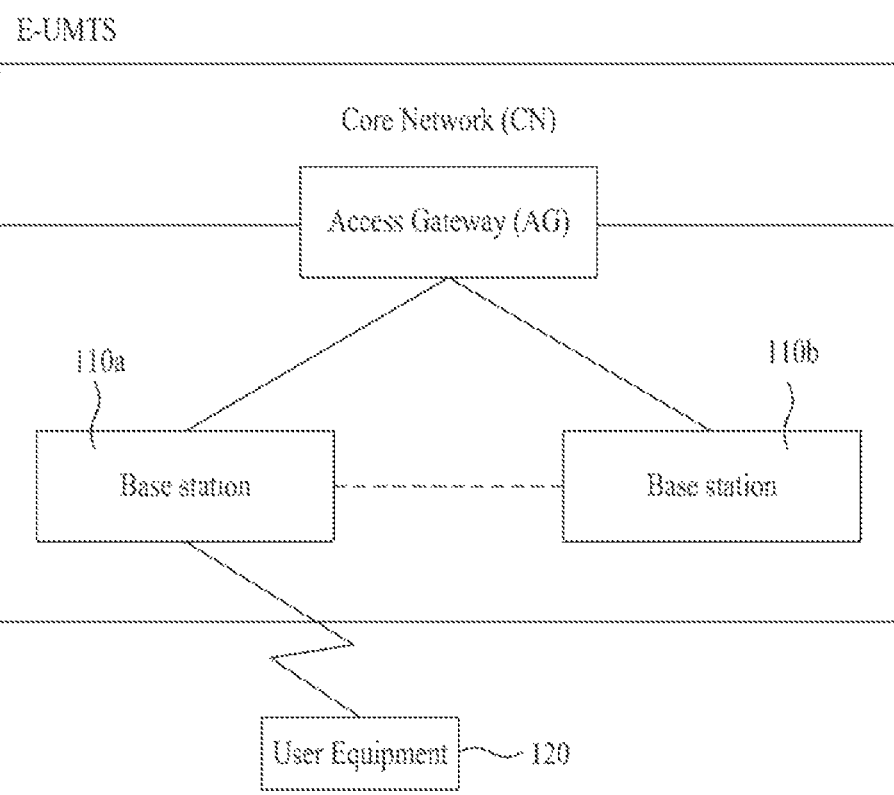
FIG. 1 is a diagram illustrating a network structure of an Evolved Universal Mobile Telecommunications System (E-UMTS)

FIG. 1 is a diagram illustrating a network structure of an Evolved Universal Mobile Telecommunications System (E-UMTS). The E-UMTS is an evolved version of the conventional UMTS, and its basic standardization is in progress under the 3rd Generation Partnership Project (3GPP). The E-UMTS may generally be referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS includes a User Equipment (UE) 120, base stations (eNode B and eNB) 110a and 110b, and an Access Gateway (AG) which is located at an end of a network (E-UTRAN) and connected to an external network. Generally, the base stations may simultaneously transmit multiple data streams for a broadcast service, a multicast service and/or a unicast service. One or more cells may exist for one base station. One cell is set to one of bandwidths of 1.25, 2.5, 5, 10, and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the user equipment of time and frequency domains to which data will be transmitted and information related to encoding, data size, hybrid automatic repeat and request (HARQ). Also, the base station transmits uplink (UL) scheduling information of uplink data to the corresponding user equipment to notify the user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment UE. The AG manages mobility of the user equipment UE on a Tracking Area (TA) basis, wherein one TA includes a plurality of cells.

Figure 2:
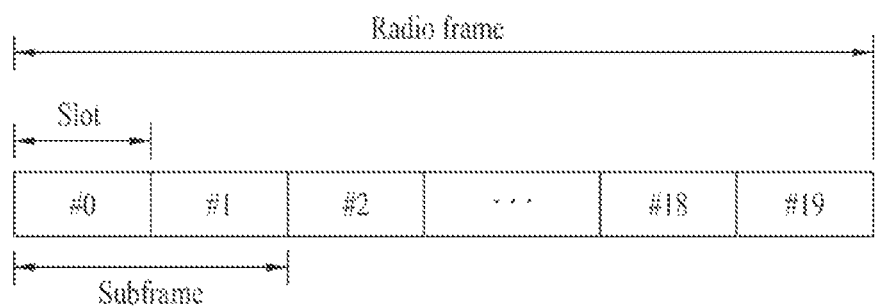
FIG. 2 is a diagram illustrating a structure of a radio frame used in an E-UMTS system.

FIG. 2 is a diagram illustrating a structure of a radio frame used in an E-UMTS.

Referring to FIG. 2, the E-UMTS uses a radio frame of 10 ms, and one radio frame includes ten (10) subframes. Each subframe includes two contiguous slots each having a length of 0.5 ms. The slot includes a plurality of symbols (for example, OFDM symbols or SC-FDMA symbols).

Figure 3:
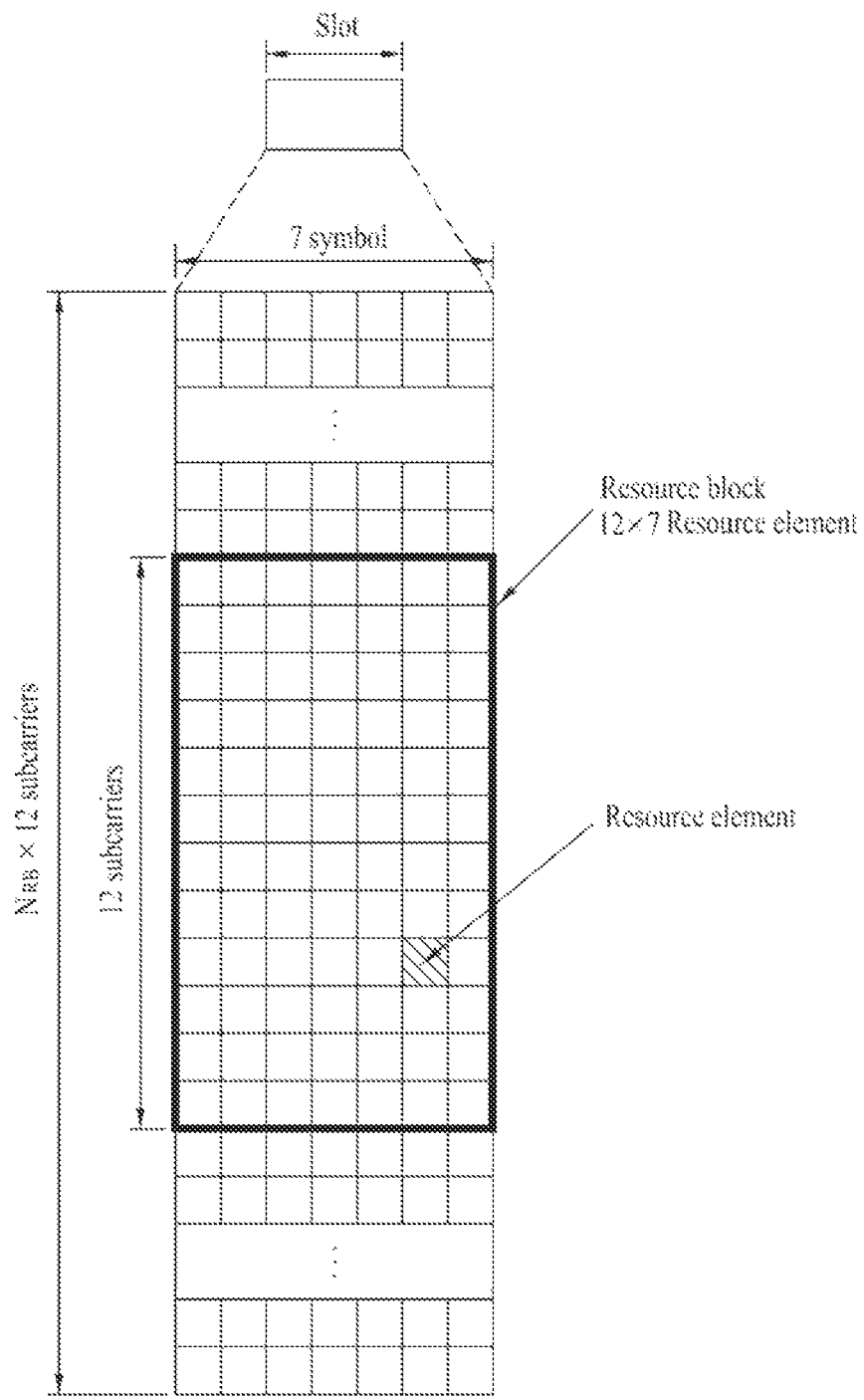
FIG. 3 is a diagram illustrating a resource grid of a radio frame.

FIG. 3 is a diagram illustrating a resource grid of a slot.

Referring to FIG. 3, the slot includes a plurality of OFDM symbols or SC-FDMA symbols in a time domain and a plurality of resource blocks in a frequency domain. One resource block includes 12×7(6) resource elements. The number of resource blocks included in a time slot is subjected to a frequency bandwidth set in a cell. Each row on a resource grid represents a minimum resource defined by one symbol and one subcarrier, and is referred to as a resource element (RE). Although an example of FIG. 3 illustrates that the time slot includes seven symbols and the resource block includes twelve subcarriers, the present invention is not limited to the example of FIG. 3. For example, the number of symbols included in the slot may be varied depending on a length of cyclic prefix (CP).

Figure 4:
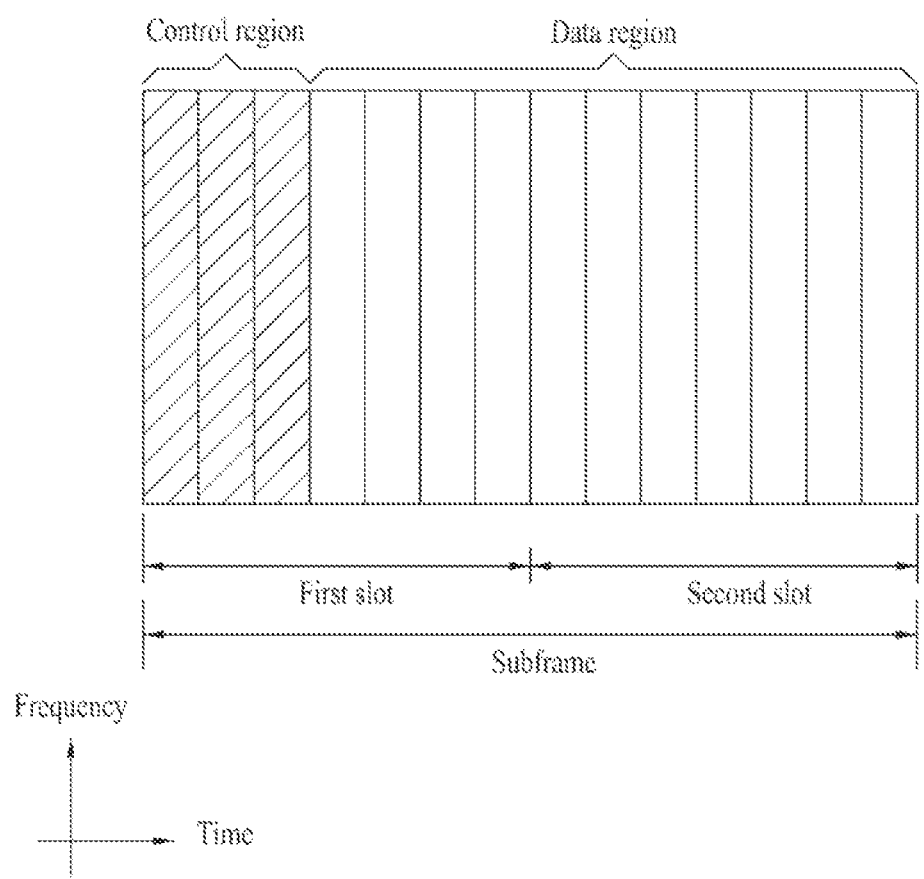
FIG. 4 is a diagram illustrating a structure of a downlink subframe.

FIG. 4 is a diagram illustrating a structure of a downlink subframe.

Referring to FIG. 4, a downlink subframe in an LTE system includes L1/L2 control region and a data region, wherein the L1/L2 control region and the data region are multiplexed in accordance with a time division multiplexing (TDM) mode. The L1/L2 control region includes first n (for example, three or four) OFDM symbols of the subframe, and the other OFDM symbols are used for the data region. The L1/L2 control region includes a physical downlink control channel (PDCCH) for carrying downlink control information, and the data region includes a downlink data channel, i.e., a physical downlink shared channel (PDSCH). In order to receive a downlink signal, the user equipment reads out downlink scheduling information from the PDCCH, and receives downlink data on the PDSCH by using resource allocation information indicated by the downlink scheduling information. The resource (that is, PDSCH) scheduled for the user equipment is allocated in a resource block unit or a resource block group unit.

The PDCCH notifies the user equipment of information related to resource allocation of transport channels, i.e., a paging channel (PCH) and a downlink-shared channel (DL-SCH), uplink scheduling grant, HARQ information, etc. The information transmitted through the PDCCH will be referred to as downlink control information (DCI). Various DCI formats are provided depending on the control information.

Table 1 illustrates a DCI format 0 for uplink scheduling.

TABLE 1

| Field | Bits | Comment |
|---|---|---|
| Format | 1 | Uplink grant or downlink assignment |
| Hopping flag | 1 | Frequency hopping on/off |
| RB assignment | 7 | Resource block assigned for PUSCH |
| MCS | 5 | Modulation scheme, coding scheme, etc. |
| New Data Indicator | 1 | Toggled for each new transport block |
| TPC | 2 | Power control of PUSCH |
| Cyclic shift for DMRS | 3 | Cyclic shift of demodulation reference signal |
| CQI request | 1 | To request CQI feedback through PUSCH |
| RNTI/CRC | 16 | 16 bit RNTI implicitly encoded in CRC |
| Padding | 1 | To ensure format 0 matches format 1A in size |
| Total | 38 | — |

\* MCS: Modulation and Coding Scheme
\* TPC: Transmit Power Control
\* RNTI: Radio Network Temporary Identifier
\* CRC: Cyclic Redundancy Check Information as to a user equipment to which data of the PDDCH are transmitted is identified using radio network temporary identity (RNTI). For example, it is assumed that the PDCCH is CRC masked with RNTI called "A," and that uplink allocation information (for example, frequency location) called "B" and transmission format information (for example, transport block size, modulation mode, coding information, etc.) called "C" are transmitted. In this case, the user equipment located in a corresponding cell monitors the PDCCH using its RNTI information, and the user equipment having RNTI "A" performs uplink transmission in accordance with information of B and C obtained from the PDCCH.

Figure 5:
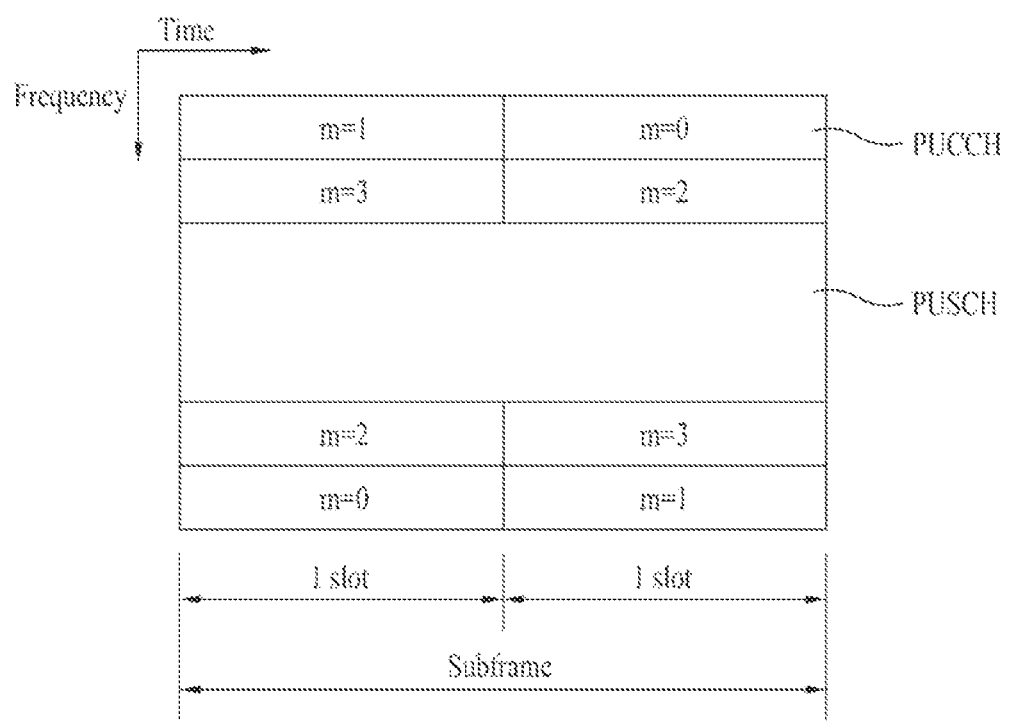
FIG. 5 is a diagram illustrating a structure of an uplink subframe.

FIG. 5 is a diagram illustrating a structure of an uplink subframe in the LTE.

Referring to FIG. 5, the uplink subframe includes a plurality of slots (for example, two slots). The respective slots may include their respective SC-FDMA symbols different from those of the other slots in accordance with a CP length. The uplink subframe may be divided into a control region and a data region on a frequency domain. The data region includes a PUSCH and is used to transmit a data signal such as voice. The control region includes a PUCCH and is used to transmit uplink control information. The PUCCH includes RB pair located at both ends of the data region on a frequency axis, and performs hopping on the border of the slots. The uplink control information includes Hybrid Automatic Retransmit reQuest (HARQ) ACK/NACK for downlink data, and channel (status) information on a downlink. The channel (status) information on the downlink includes a precoding matrix indicator (PMI), a rank indicator (RI), and a channel quality indicator (CQI).

Modeling of MIMO System

Figure 6:
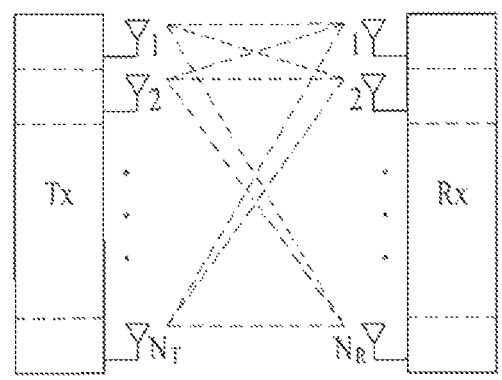
FIG. 6 is a schematic diagram illustrating an antenna of a multi-antenna system.

FIG. 6 is a schematic view illustrating a wireless communication system provided with multiple antennas. As shown in FIG. 6, if the number of transmitting antennas increases to $N_T$ and the number of receiving antennas increases to $N_R$, channel capacity increases in proportion to the number of antennas. A transmission rate may increase theoretically as much as a value obtained by multiplying a maximum transmission rate $R_0$, which corresponds to a case where one antenna is used, by an increase rate $R_i$.

$$R_i = \min(N_T, N_R) \quad \text{[Equation 1]}$$

A communication method in a MIMO system will be described in more detail with reference to mathematical modeling. It is assumed that $N_T$ transmitting antennas and $N_R$ receiving antennas exist.

First of all, a transmitting signal will be described. If there exist $N_T$ transmitting antennas, the number of maximum transmission information is $N_T$. The transmission information may be expressed as follows.

$$s = [s_1, s_2, \ldots, s_{N_T}]^T \quad \text{[Equation 2]}$$

Different kinds of transmission power may be applied to each of the transmission information $s_1, s_2, \ldots, s_{N_T}$. At this time, supposing that each transmission power is $P_1, P_2, \ldots, P_{N_T}$, transmission information of which transmission power is controlled may be expressed as follows.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

Also, $\hat{s}$ may be expressed as follows using a diagonal matrix P.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

It is considered that a weight matrix W is applied to the information vector $\hat{s}$ of which transmission power is controlled, so as to obtain $N_T$ transmitting signals $x_1, x_2, \ldots, x_{N_T}$. In this case, the weight matrix W serves to properly distribute the transmission information to each antenna. Such transmitting signals $x_1, x_2, \ldots, x_{N_T}$ may be expressed as follows using a vector X.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

In this case, $W_{ij}$ means a weight value between the ith transmitting antenna and the jth information. W may be referred to as a precoding matrix.

If there exist $N_R$ receiving antennas, receiving signals $y_1, y_2, \ldots, y_{N_R}$ of the respective antennas may be expressed by a vector as follows.

$$y = [y_1, y_2, \ldots, y_{N_R}]^T \quad \text{[Equation 6]}$$

In case of channel modeling in the MIMO communication system, channels may be classified depending on indexes of transmitting and receiving antennas. In this case, a channel that passes from the jth transmitting antenna to the ith receiving antenna will be expressed as $h_{ij}$. It is noted that index of the receiving antenna is prior to index of the transmitting antenna in index of $h_{ij}$.

Figure 7:
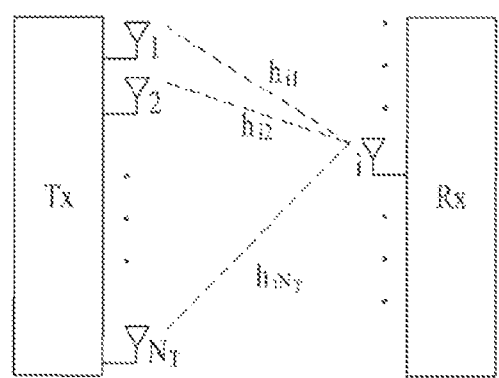
FIG. 7 is a diagram illustrating a channel from $N_T$ transmitting antenna to a receiving antenna i.

FIG. 7 illustrates channels from $N_T$ transmitting antennas from the receiving antenna i. Several channels may be grouped into one and then may be expressed by a vector type or a matrix type. As shown in FIG. 7, the channels from $N_T$ transmitting antennas to the ith receiving antenna may be expressed as follows.

$$h_i^T = [h_{i1}, h_{i2}, \ldots, h_{iN_T}] \quad \text{[Equation 7]}$$

Accordingly, all channels from $N_T$ transmitting antennas to $N_R$ receiving antennas may be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & & \ddots \\ h_{N_R 1} & h_{N_R 2} & \ldots & h_{N_R N_T} \end{bmatrix} \quad \text{[Equation 8]}$$

Since additive white Gaussian noise (AWGN) is actually added to the channels after the above channel matrix H. AWGN $n_1, n_2, \ldots, n_{N_R}$ added to each of the $N_R$ receiving antennas may be expressed as follows.

$$n = [n_1, n_2, \ldots, n_{N_R}]^T \quad \text{[Equation 9]}$$

The receiving signals obtained using the above equation modeling may be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & & \ddots \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

In the mean time, the number of rows and columns of the channel matrix H indicating the channel status is determined by the number of transmitting antennas and the number of receiving antennas. The number of rows in the channel matrix H is the same as the number $N_R$ of receiving antennas, and the number of columns is the same as the number $N_T$ of transmitting antennas. In other words, the channel matrix H may be expressed by $N_R \times N_T$ matrix.

A rank of the matrix is defined by a minimum number of the number of rows and the number of columns, which are independent from each other. Therefore, the rank of the matrix cannot have a value greater than the number of rows or the number of columns. Rank (rank(H) of the channel matrix H may be limited as follows.

$$\text{rank}(H) \leq \min(N_T, N_R) \quad \text{[Equation 11]}$$

The rank may also be defined by the number of eigen values not 0 when eigen value decomposition is performed for the matrix. Similarly, the rank may be defined by the number of singular values not 0 when singular value decomposition (SVD) is performed for the matrix. Accordingly, in the channel matrix, the rank may physically mean a maximum number of columns or rows that can transmit different kinds of information from a given channel.

Reference Signal (RS)

In the wireless communication system, since a packet is transmitted through a radio channel, signal distortion may occur during transmission of the packet. In order to normally receive the distorted signal, distortion of the received signal should be compensated using channel information (or channel status information). In order to discover the channel information, it is required to transmit the signal known by both a transmitter and a receiver and discover the channel information using a distortion level of the signal when the signal is transmitted through the channel. At this time, the signal known by both the transmitter and the receiver will be referred to as a pilot signal or a reference signal. In case that multiple antennas are used, a separate reference signal per transmitting antenna should be provided.

In the wireless communication system, the reference signal may be divided into two types. Namely, examples of the reference signal include a reference signal (RS for channel measurement) intended for acquisition of channel information and a reference signal (RS for demodulation) intended for data demodulation. For convenience, the description will be made based on the downlink RS. Since the RS for channel measurement is intended for acquisition of channel information on the downlink, it needs to be transmitted through a full band. Also, the RS for channel measurement should be received and measured even by a user equipment that does not receive downlink data for a specific subframe. Also, the RS for channel measurement may also be used for measurement of handover. Meanwhile, the RS for demodulation is transmitted from the base station together with a corresponding resource when the base station transmits downlink data. In this case, the user equipment may estimate a channel to which downlink data are transmitted, by receiving the RS for demodulation, whereby the user equipment may demodulate the downlink data.

Figure 8:
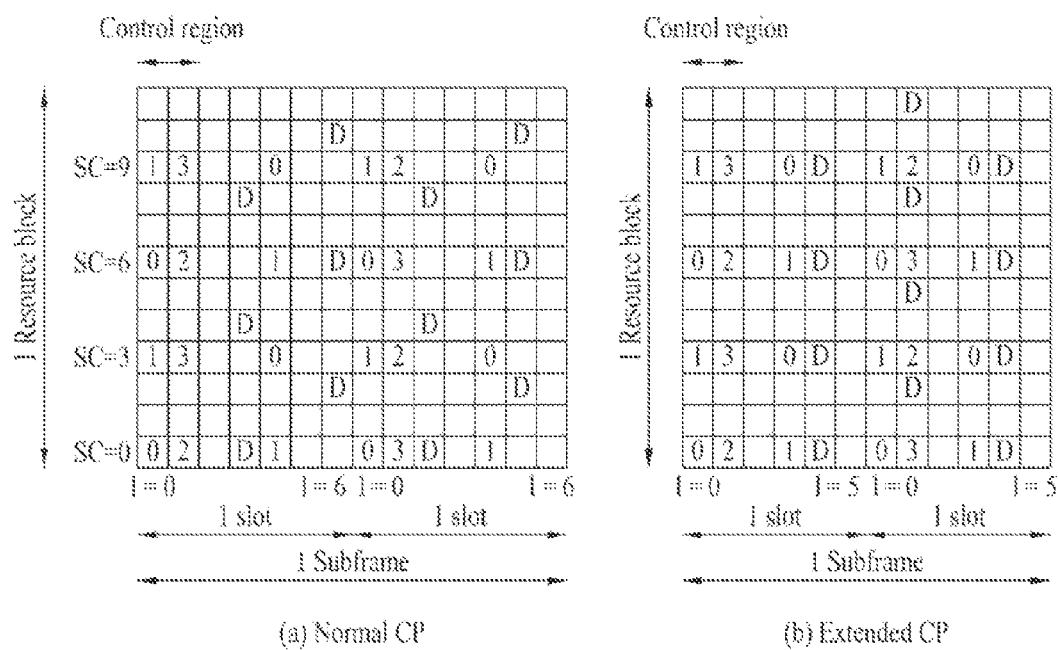
FIG. 8 is a diagram illustrating a downlink reference signal (RS) pattern in a long term evolution (LTE) system.

FIG. 8 is a diagram illustrating a downlink reference signal (RS) pattern of an LTE system.

Referring to FIG. 8, in the LTE system, two types of downlink reference signals are defined for unicast service. There are provided two types of reference signals, i.e., a common reference signal (CRS) 0~3 for acquisition of channel status information and measurement of handover and a user equipment-specific reference signal (UE-specific RS) for data demodulation. The user equipment-specific RS may be referred to as a dedicated RS (DRS). The UE-specific reference signal is only used for data demodulation, and the CRS is used for both acquisition of channel information and data demodulation. The CRS is a cell-specific reference signal, and is transmitted by the base station per subframe through a full band. Since the LTE system supports maximum four transmitting antennas on the downlink, the CRSs for maximum four antenna ports may be transmitted depending on the number of transmitting antennas of the base station. The CRS for each antenna port is multiplexed within the RB in accordance with a frequency division multiplexing (FDM) mode.

The LTE-A system which is an evolved version of the LTE system should support maximum eight transmitting antennas for downlink transmission. Accordingly, reference signals for maximum eight transmitting antennas should also be supported. In the LTE system, since downlink reference signals are defined for maximum four antenna ports, if the base station includes maximum eight downlink transmitting antennas in the LTE-A system, reference signals for these antenna ports should be defined additionally. The reference signals for maximum eight transmitting antenna ports should be designed for two types of reference signals, i.e., reference signal for channel measurement and reference signal for data demodulation.

One of important considerations in designing the LTE-A system is backward compatibility. Namely, backward compatibility means that the LTE user equipment should be operated normally even in the LTE-A system without any problem and the LTE-A system should also support such normal operation. In view of reference signal transmission, reference signals for maximum eight transmitting antenna ports should be defined additionally in the time-frequency domain to which CRS defined in the LTE is transmitted. However, in the LTE-A system, if reference signal patterns for maximum eight transmitting antennas are added to full band per subframe in the same manner as the CRS of the existing LTE system, RS overhead becomes too great. Accordingly, the reference signal designed newly in the LTE-A system may be divided into two types. Examples of the two types of reference signals include a channel state information-reference signal (CSI-RS) (or may be referred to as channel state indication-RS) for channel measurement for selection of modulation and coding scheme (MCS) and precoding matrix index (PMI), and a data demodulation-reference signal (DM-RS) for demodulation of data transmitted to eight transmitting antennas. The CSI-RS for channel measurement is designed for channel measurement mainly unlike the existing CRS used for channel measurement, handover measurement, and data demodulation. The CSI-RS may also be used for handover measurement. Since the CSI-RS is transmitted only to obtain channel state information, it may not be transmitted per subframe unlike the CRS of the existing LTE system. Accordingly, in order to reduce overhead, the CSI-RS may intermittently be transmitted on the time axis. For example, the CSI-RS may be transmitted periodically with an integer multiple period of one frame, or may be transmitted at a specific transmission pattern. The transmission period or transmission pattern of the CSI-RS may be configured by the base station. In order to measure the CSI-RS, the user equipment should know information as to time-frequency location of the CSI-RS for each antenna port of a cell to which the user equipment belongs, CSI-RS sequence and CSI-RS frequency shift. On the other hand, the DM-RS is dedicatedly transmitted to the user equipment which is scheduled in the corresponding time-frequency domain for data demodulation. In other words, the DM-RS of a specific user equipment is only transmitted to the region where the corresponding user equipment is scheduled, i.e., the time-frequency domain that receives data.

Channel Quality Indicator (CQI)

It is required to feed back channel information for efficient communication. To this end, channel information of the downlink is transmitted to the uplink while channel information of the uplink is transmitted to the downlink. This channel information will be referred to as a channel quality indicator (CQI). The CQI may be generated by various methods.

Examples of the methods include a method for quantizing a channel status (or spectrum efficiency), a method for calculating a signal to interference and noise ratio (SINR), and a method for notifying an actual status of a channel such as modulation coding scheme.

Of the various methods for generating a CQI, it is general that the CQI may actually be generated based on the MCS. This will be described in more detail. The CQI for transmission mode of HSDPA in the 3GPP may be generated. If the CQI is generated based on the MCS, the MCS includes a modulation scheme, a coding scheme, and a coding rate based on the modulation scheme and the coding scheme. Accordingly, if the modulation scheme and/or the coding scheme is changed, the CQI should be changed correspondingly. For this reason, at least one CQI per codeword is required.

Table 2 illustrates that the CQI is generated by the MCS.

TABLE 2

| CQI index | modulation | code rate x 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

If MIMO is applied to the system, the number of required CQIs is changed. Since the MIMO system generates multiple channels by using multiple antennas, several codewords may be used. Accordingly, several CQIs should be used. If a plurality of CQIs are used, control information is increased proportionally.

Figure 9:
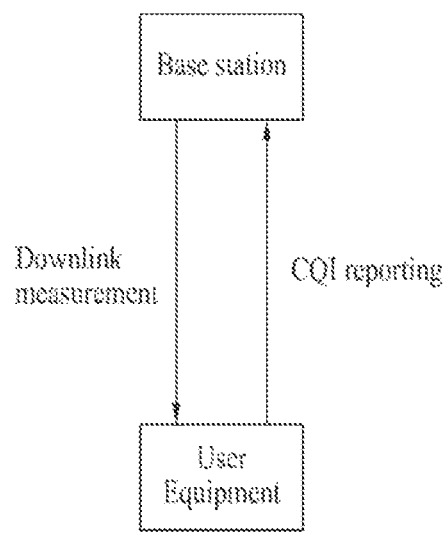
FIG. 9 is a conception diagram illustrating generation and transmission of CQI.

FIG. 9 is a conception diagram illustrating generation and transmission of CQI. The wireless communication system may use link adaptation to use given channel capacity within the maximum range. Link adaptation controls the MCS and a transmission power in accordance with the given channel. To this end, the user should feed channel quality information back to the base station.

Referring to FIG. 9, the user equipment measures downlink quality and reports a CQI value selected based on the measured downlink quality to the base station through an uplink control channel. The base station performs downlink scheduling (user equipment selection, resource allocation, etc.) in accordance with the reported CQI. Examples of the CQI value may include a signal to interference and noise ratio (SINR), a carrier to interference and noise ratio (CINR), a bit error rate (BER), a frame error rate (FER), and a value of the FER converted into transmittable data. In case of the MIMO system, rank information (RI) and precoding matrix information (PMI) may additionally be provided as information reflecting the channel status. For example, after observing time/frequency interval, the user equipment may use the greatest value of CQI indexes of Table 2, which satisfies the following condition, as a CQI value to be reported from uplink subframe n.

Condition: if a single PDSCH transmission block is received through a resource block (CQI reference resource) related to CQI index with combination of transmission block size and a modulation scheme corresponding to the CQI index, a transmission block error probability does not exceed 0.1.

If a frequency band used in the wireless communication system exceeds a coherence bandwidth, a channel is rapidly changed within the corresponding bandwidth. In particular, in the multi-carrier system (for example, OFDM system), a plurality of subcarriers exist within a given bandwidth, and modulation symbols are transmitted through each subcarrier, whereby the channel may be transmitted to each subcarrier. In the multi-carrier system that uses a plurality of subcarriers, a feedback rate of the channel information may be increased rapidly. For this reason, waste of a control signal (control overhead) may occur. Several methods for reducing control overhead have been suggested.

As a method for reducing control overhead, a method for reducing an information rate of a channel quality indicator will be described in brief.

First of all, a channel information transmission unit may be changed to reduce the information rate of the channel quality indicator. For example, in the OFDM system, the channel information may be transmitted in a subcarrier group unit not a subcarrier unit. If twelve subcarriers are grouped into one subcarrier group in the OFDM system that uses 2048 subcarriers, since a total of 171 subcarrier groups are formed, the channel information actually transmitted is reduced from 2048 to 171.

In this specification, if the frequency band includes a plurality of subcarriers and CQI is reported in a subcarrier group unit in the same manner as the OFDM system, a basic unit for CQI generation is defined as a CQI subcarrier group or CQI subband. Meanwhile, if the frequency band is not divided into subcarrier, etc., a full frequency band may be divided into some frequency bands and CQI may be generated based on the divided frequency bands. At this time, the frequency bands divided for CQI generation may be defined as CQI subbands.

Second, the information rate of the channel quality indicator may be reduced by compressing the channel information. For example, the channel information of each subcarrier may be compressed and transmitted in the OFDM system. The compression scheme includes a discrete cosine transform (DCT) scheme, for example.

Third, a frequency band (for example, CQI subband) for generating channel information may be selected to reduce the information rate of the channel quality indicator. For example, in the OFDM system, the channel information for all subcarriers is not transmitted, M subcarriers or subcarrier groups may be selected from the subcarriers or the subcarrier groups and then may be transmitted (M scheme). According to the M scheme, M frequency bands having the best channel quality may be selected (Best-M scheme), or M frequency bands preferred by the base station and/or the user equipment may be selected (Preferred-M scheme). The Preferred-M scheme includes the Best-M scheme. When the frequency band is selected to transmit CQI, actually transmitted information may be divided into two parts. The first part is a CQI value part and the second part is a CQI index part. For convenience, the Best-M scheme is used as a main example of the M scheme unless otherwise specified.

Figure 10:
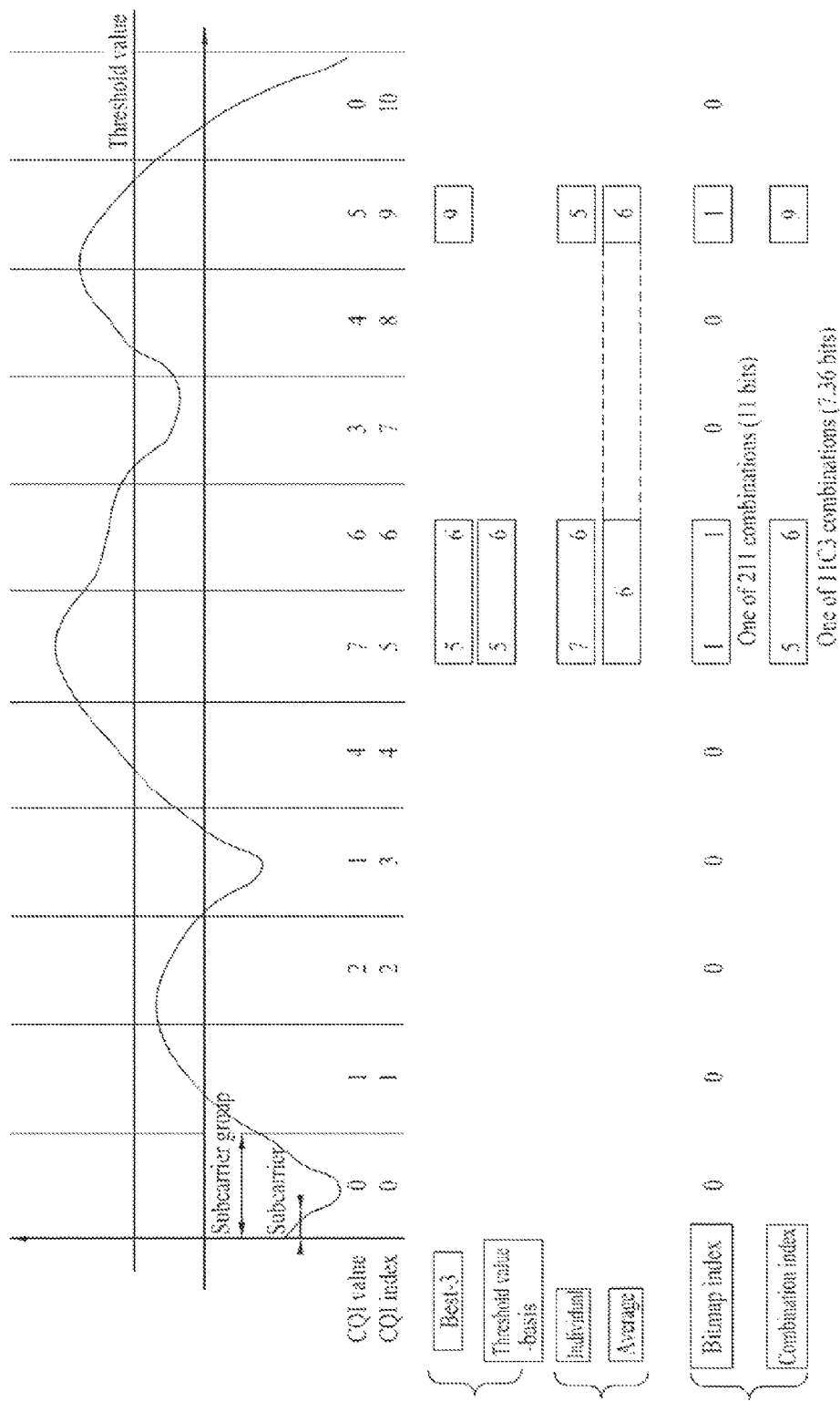
FIG. 10 is a diagram illustrating a scheme for generating and transmitting frequency band selective CQI.

FIG. 10 is a diagram illustrating a scheme for generating CQI by selecting CQI subband in a frequency domain. The frequency band selective CQI scheme includes three parts. The first part is that the user equipment selects a frequency band (that is, CQI subband) which will generate a CQI. The second part is that the user equipment generates and transmits a CQI by manipulating channel information of the selected frequency bands. The third part is that the user equipment transmits identification information (for example, subband index) on the selected frequency band.

Each part is divided for convenience. The order of the parts may be changed, and two or more parts may be incorporated into one. Each part will be described in more detail.

The CQI subband selection method includes a Best-M scheme and a threshold-based scheme. The Best-M scheme is to select M CQI subbands having good channel status. In this case, the user equipment selects CQI subbands of indexes Nos. 5, 6 and 9 having good channel status by using the Best-3 scheme. Meanwhile, the threshold-based scheme selects CQI subband having channel status higher than the given threshold value. In this case, the user equipment selects CQI subbands of indexes Nos. 5 and 6 higher than the threshold value.

The method for generating and transmitting a CQI value includes an individual method and an average method. The individual method is to transmit all CQI values of the selected CQI subbands. Accordingly, according to the individual method, if the number of the selected CQI subbands is increased, CQI values to be transmitted are increased. On the other hand, the average method is to transmit an average of the CQI values of the selected CQI subbands. Accordingly, the average method is advantageous in that one CQI value is transmitted regardless of the number of the selected CQI subbands. However, since a CQI average value for several CQI subbands is only transmitted, exactness is reduced. The average value may be a simple arithmetic average or an average considering channel capacity.

The method for transmitting a CQI subband index includes a bitmap index method and a general combinatorial index method. According to the bitmap index method, one bit is allocated to each CQI subband, and if the corresponding CQI subband is used, 1 is allocated to the corresponding bit. If the corresponding CQI subband is not used, 0 is allocated to the corresponding bit. A bit value may be set contrary to the above. The bitmap index method requires bits as much as a total of CQI subbands, whereas CQI subbands may be represented through a given number of bits regardless of how many CQI subbands are used. Meanwhile, according to the combinatorial index method, it is determined how many CQI subbands will be used, and when a given number of CQI bands are selected from a total number of CQI subbands, all combinations are mapped into each index. In more detail, a total number of N CQI subbands exist, and when M CQI subband indexes are used among N CQI subbands, a total number of possible combinations are as follows.

$$_N C_M = \frac{N!(N-1)!}{M!} \quad \text{[Equation 12]}$$

Accordingly, bits for representing number of cases based on Equation 12 may be determined through the following Equation.

$$\lceil \log_2(_N C_M) \rceil = \left\lceil \log_2\left(\frac{N!(N-1)!}{M!}\right) \right\rceil \quad \text{[Equation 13]}$$

In this example, since three CQI subbands are selected from a total of eleven CQI subbands, number of possible cases may be $_{11}C_3=165$, and bits for representing the number of possible cases are 8 bits ($2^7 \leq {_{11}C_3} \leq 2^8$).

CoMP (Cooperative Multipoint Transmission/Reception) Method

The post-LTE-A system is intended to introduce a system that enhances system throughput through coordination between cells. This system will be referred to a Cooperative Multipoint Transmission/Reception (CoMP) system. The CoMP may be referred to as Co-MIMO (Cooperative Multiple Input Multiple Output), collaborative MIMO, network MIMO, etc. The CoMP system means a communication system that two or more base stations, access points or cells perform communication with the user equipment in cooperative with one another to effectively perform communication between a specific user equipment and the base station, access point or cell. In this specification, the base station, the access point, or the cell may be used to refer to the same thing.

Figure 11:
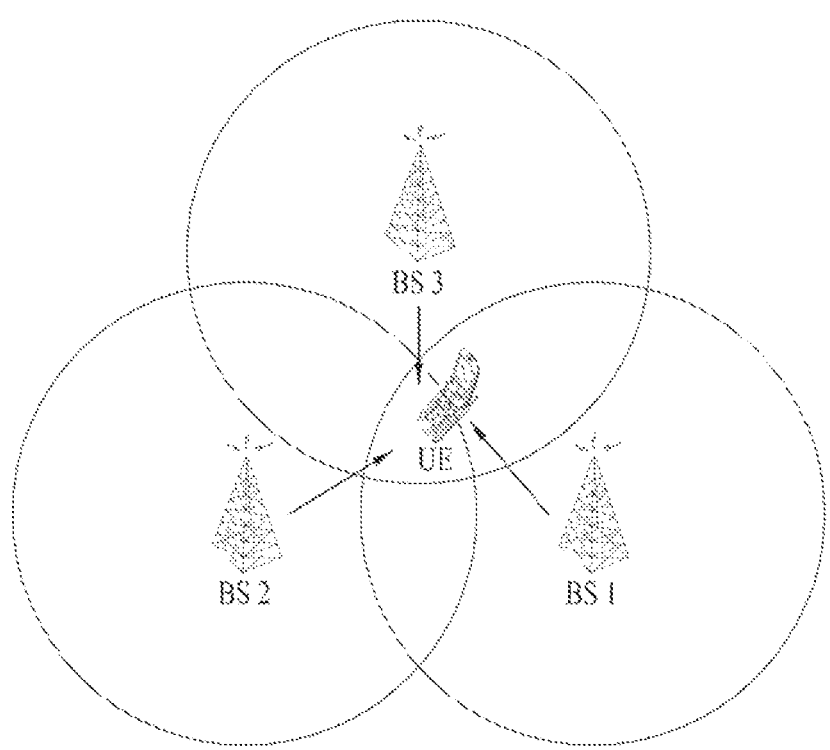
FIG. 11 is a diagram illustrating an example of performing coordinated multipoint transmission/reception (CoMP)

FIG. 11 is a diagram illustrating an example of performing coordinated multipoint transmission/reception (CoMP). Referring to FIG. 11, the wireless communication system includes a plurality of base stations BS1, BS2 and BS3, which perform CoMP, and a user equipment. The plurality of base stations that perform CoMP transmit data to the user equipment in cooperative with one another. The CoMP system may be divided into the following schemes depending on data transmission from each base station:

Joint processing (CoMP Joint Processing: CoMP-JP); and
CoMP Cooperative Scheduling/Cooperative beamforming (CoMP-CS/CB).

In case of CoMP-JP, data are simultaneously transmitted from the respective base stations, which perform CoMP, to one user equipment, and the user equipment improves receiving throughput by combining the signals from the respective base stations. On the other hand, in case of CoMP-CS/CB, data are transmitted to one user equipment through one base station at a random moment, and scheduling or beamforming is performed such that interference from the other base stations is minimized.

In order that the user equipment receives a downlink service in accordance with a CoMP scheme, cooperative cells should know downlink channel information from the cooperative cells to the corresponding user equipment. In other words, the user equipment should feed back downlink channel information from each cell to receive CoMP service. If the user equipment transmits downlink channel information to a serving base station, the serving base station shares the received downlink channel information with a cooperative neighboring base station. In case that the user equipment receives a service from a single cell only and in case that the user equipment receives a service from a plurality of cells, feedback contents, format, and feedback information rate, which are fed back from the user equipment, are varied depending on each case.

Referring to FIG. 11, the serving base station of the user equipment is BS1, and the BS1 provides a service to the user equipment in accordance with a CoMP mode in cooperation with BS2 and BS3. In other words, CoMP cooperative/measurement sets of the user equipment are BS1, BS2 and BS3, and the user equipment measures the signals from the three base stations, and feeds the measured result back to the serving base station. The serving base station shares the measurement result with a neighboring base station through a backbone.

The base station schedules a downlink resource by using feedback information such as CQI transmitted from the user equipment. When the user equipment that receives a service in accordance with the CoMP mode feeds back the information such as CQI, additional information different from a general single cell mode is required. In particular, when the user equipment selects M subbands having Best-M CQI, that is, good CQI are selected from full subbands, and selects Best-M subbands in accordance with a CQI report mode for reporting CQI only for the selected M subbands, information as to a basis that Best-M subbands are selected should be reported to the user equipment. Although CQI may be very low at the subband having serious interference from a neighboring cell in a general single cell operation, if interference of the corresponding subband may be reduced through cooperation with the neighboring cell, CQI of the corresponding subband may be improved. Also, since there are provided various CoMP systems where several cells provide a service in cooperation with one another, the best subband and the CQI value of the best subband may be varied depending on the CoMP systems.

The CQI report mode of the Best-M scheme may be referred to as user equipment-selective CQI mode or subband CQI mode, and has an advantage in that uplink feedback overhead of the user equipment is reduced as compared with the CQI report mode of the full band. In order to reduce CQI feedback overhead, the CQI report mode may be used as one of the CQI feedback mode in the LTE-A system. The user equipment should select a subband to report CQI on the assumption what CoMP system is used when the CQI is reported in accordance with a subband CQI mode. When the user equipment reports the CQI, it should know information as to whether it is operated in a single cell mode or receives a service through cooperation with several cells. If the user equipment receives a service through cooperation, it should know information as to a type of a service provided to the user equipment, whereby the user equipment may calculate the CQI by assuming a specific type and select the best band. In calculating the CQI, space channel information of a serving cell and space channel information of a neighboring cell should be considered together. In the present invention, a precoding matrix indication (PMI) is used as a main example of the space channel information. The PMI represents space channel information, and may be interpreted as other terminology such as a channel direction indicator (CDI).

Hereinafter, a method for calculating a CQI and the best band in accordance with a CoMP mode will be described.

Embodiment 1: Dynamic Cell Selection (DCS)

If a DCS scheme of the JP scheme in the CoMP system is used, if a transmission point is not exactly identified in a method for calculating a CQI of the user equipment and selecting specific M subbands to report the CQI, CoMP gain is not obtained normally. The transmission point includes a cell, a base station, an access point, and a relay. In the DCS scheme, a data transmission point of the user equipment may be varied per subframe. If the transmission point is varied, the location of the subband having the best receiving channel quality (or spectrum efficiency) (for example, receiving SINR) of the user equipment may be varied. Accordingly, when the user equipment calculates and reports the CQI in accordance with the DCS scheme, the corresponding user equipment is necessarily required to know its transmission point. Since it is difficult for the user equipment to previously know the transmission point, the user equipment may assume a specific transmission point and calculate the CQI based on the specific transmission point.

In order that the user equipment calculates/reports the CQI in accordance with the DCS scheme, when the transmission point is assumed, the present invention suggests a method for selecting a transmission point at a user equipment-side.

1.1. Channel Independent Selection

The user equipment calculates a CQI by randomly assuming a transmission point among cells within a CoMP set. According to this method, a specific transmission point is simply assumed by a round robin mode and then receiving SINR, CQI and PMI of the user equipment are calculated and reported. When the user equipment assumes the transmission point, the base station-side may designate a rule for selecting a transmission point for CQI/PMI report.

1.2. Channel Dependent Selection

When the user equipment calculates and reports CQI, a cell having the best channel is assumed as a transmission point. In this case, two methods, i.e., a method for selecting a cell having the best receiving SINR for a full band as a transmission point and a method for selecting a cell having the best receiving SINR per subband as a transmission point are provided.

1.3. Method for Selecting One Transmission Point for a Full Band

The user equipment calculates receiving SINR per subband for each cell within a CoMP set on the assumption that each cell is a transmission point. After calculating receiving SINR per subband on the assumption that one PMI is used in a wideband for all PMIs within a codebook subset, the user equipment selects M subbands having the greatest receiving SINR, and selects PMI correspondingly. At the same time, the user equipment calculates wideband receiving SINR and wideband PMI for a full band. The same process for all cells within the CoMP set is repeated.

Figure 12:
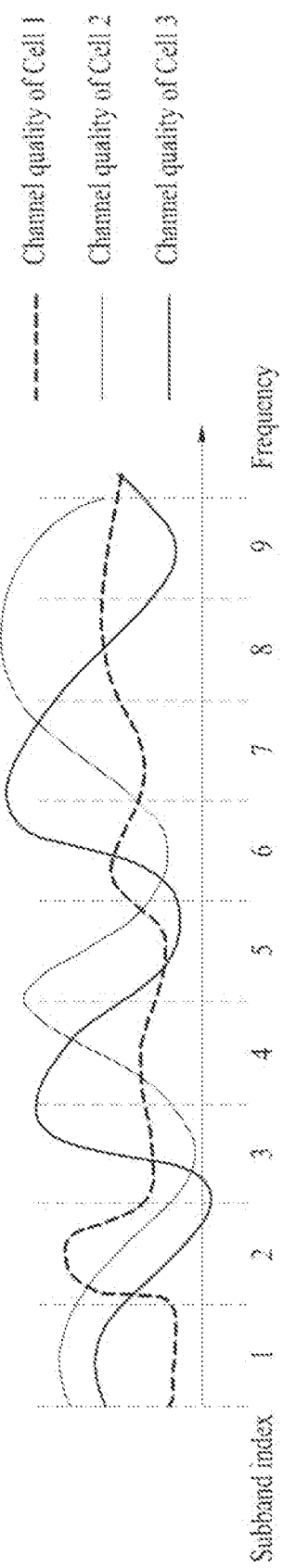
FIG. 12 is a diagram illustrating downlink channel quality received from a CoMP set.

FIG. 12 is a diagram illustrating downlink channel quality received by the user equipment having cells 1~3 as a CoMP set from a CoMP set. In the example of FIG. 12, when the best CQI subband is selected, if the cell 1 is the transmission point, the subband no. 2 is selected as the best subband, and CQI value and index of the subband no. 2 should be reported to the base station. However, if the cell 3 is the transmission point, the subband no. 7 is selected as the best subband, and CQI value and index of the subband no. 2 should be reported to the base station.

If the cell 1 is the transmission point, the user equipment calculates receiving SINR at each subband and selects best M subbands by assuming the signal from the cell 1 as a magnetic signal. Also, if the cell 2 is the transmission point, the user equipment calculates receiving SINR at each subband and selects best M subbands by assuming the signal from the cell 2 as a magnetic signal. Likewise, if the cell 3 is the transmission point, the user equipment performs the same calculation. Moreover, the cell having the greatest receiving SINR sum for best M subbands selected on the assumption that the respective cells 1, 2 and 3 are the transmission points is assumed as the transmission point. At this time, the selected M subbands, CQI value at each subband, selected subband index, and an indicator (cell ID, hypothesis) indicating a transmission point for subband selection are reported.

Even though the CQI report mode of the user equipment is not the mode for selecting a subband and reporting the CQI, the CQI should be calculated in view of the transmission point. To this end, the user equipment should exactly know the transmission point in accordance with the DCS scheme. In order to exactly know the transmission point at the time when the user equipment performs feedback, the user equipment should be signaled from the base station. For example, when a feedback mode is reported as a DCS mode through a PDCCH, the base station should designate a transmission point. However, it is difficult for the user equipment to exactly know the transmission point in accordance with the DCS scheme whenever the user equipment feeds back channel information. Accordingly, in the DCS scheme, the user equipment should calculate the CQI by assuming a specific cell as a transmission point and feed back the calculated information. The CQI is calculated based on downlink receiving SINR, strength of a signal transmitted from the transmission point in the SINR calculation is calculated as a magnetic signal (S), and strength of a signal transmitted from the other part other than the transmission point is calculated interference signal (I).

1.4. Method for Selecting a Transmission Point Per Subband

For each cell within the CoMP set, the user equipment calculates receiving SINR per subband on the assumption that each cell is the transmission point. Of the receiving SINR values calculated per subband for each transmission point, the greatest value is selected as the receiving SINR at the corresponding subband, and the cell at this time is assumed as the transmission point at the corresponding subband. Afterwards, M subbands having the best subband receiving SINR are selected, the CQI is calculated on the basis of the receiving SINR at the corresponding subband, and the CQI and PMI per subband and transmission point indicator (cell ID) per corresponding subband are reported to the user equipment.

In other words, receiving SINR $SINR_{i,j}$ per subband, i.e., per cell within the CoMP set is calculated. i represents a subband index, and j represents a cell index within the CoMP set. Of the receiving SINR values $SINR_{i,\ j}$, the subband receiving SINR is obtained as follows.

$$SINR_i = \mathop{\mathrm{argmax}}_{j} SINR_{i,j} \qquad \text{[Equation 14]}$$

It is assumed that j satisfying the above Equation is the transmission point at the corresponding subband i.

When the user equipment calculates the receiving SINR, it is assumed that one PMI is used as a wideband for all PMIs within a codebook subset, whereby receiving SINR per subband is calculated and the optimized wideband PMI is selected. When it is assumed that a cell having the best receiving SINR per subband is the transmission point, the optimized PMI per transmission point should be reported. Unlike this, if the receiving SINR is calculated on the assumption that different PMIs per subband are used for all PMIs within the codebook subset per subband, PMI per subband should be reported together with the assumption of the transmission point and CQI for each subband.

Each cell is assumed as the transmission point even in the other CQI report mode not the CQI report mode that the user equipment reports CQI by selecting specific M subbands, whereby the receiving SINR is calculated and CQI of a cell having the greatest SINR value is reported on the basis of the calculated receiving SINR. Even in the mode for reporting CQI for all subbands, cell 1 is assumed as the transmission point, whereby receiving SINR of all subbands is calculated. Also, cell 2 and cell 3 are respectively assumed as the transmission points, whereby receiving SINR at all the subbands is calculated. Then, the cell having the greatest sum of receiving SINR values for all the subbands is assumed as the transmission point by the user equipment-side, and a CQI value of the corresponding transmission point is reported.

Likewise, when a specific cell is assumed as the transmission point, each receiving SINR is calculated even in a mode for reporting one wideband CQI value only for a full band, and the cell having the greatest receiving SINR is assumed as the transmission point, whereby a wideband CQI is calculated and the calculated value is reported. When the CQI value is reported, it is required that a cell assumed as the transmission point to calculate the CQI value should be specified.

Embodiment 2: Joint Transmission (JT)

When the user equipment selects a subband for reporting a CQI and reports a CQI for the corresponding subband in accordance with the JT scheme, there are provided a scheme for selecting a CQI subband on the assumption that all cells within the CoMP set are transmission points and a scheme for selecting a CQI subband on the assumption that only a serving cell is the transmission point.

In case of the former scheme, the user equipment calculates SINR combined per subband on the assumption that signals from all the cells within the CoMP set are regarded as magnetic signals. M subbands having the best SINR are selected on the basis of the calculated receiving SINR per subband, and the CQI at the corresponding subband is reported. Of all the PMIs within the codebook subset, the optimized PMI per cell is selected, and the signals from the respective cells are regarded as the magnetic signals, whereby receiving SINR per subband is calculated and a subband is selected. And, PMI per cell is reported together with the selected subband index and subband CQI.

However, since actual data transmission is selected by the base station-side, it is not always efficient that the user equipment reports CQI on the assumption that all the cells transmit data to the user equipment. Considering switching to single cell operation, a scheme for allowing a user equipment to select a subband on the basis of a serving cell and report a CQI is suggested. In other words, the user equipment calculates receiving SINR of the serving cell per subband and reports M subband indexes having good receiving SINR and PMI and CQI of the corresponding subband on the assumption that signals from the other cells within the CoMP set in addition to the signal from the serving cell are regarded as interference.

Otherwise, when M subbands to be reported are selected, best M subbands are selected on the basis of the receiving SINR of the serving cell, and CQI at the corresponding subband is calculated and reported on the basis of the combined SINR values on the assumption that cells within all the CoMP sets are transmission points. In this case, PMI per cell should be reported together with the CQI.

Embodiment 3: Coordinated Scheduling/Beamforming (CS/CB)

The CoMP operation of the CS/CB scheme reduces interference of a specific cell with a serving cell through beamforming within a coordinated set and provides the user equipment with a service at a higher data rate than that of single cell operation. Accordingly, CQI calculation and best subband selection are varied depending on which cell performs beam avoidance. The user equipment may calculate CQI and select a subband to be reported to the base station on the assumption that a specific cell performs beam avoidance through beamforming.

If the user equipment reports a CQI in accordance with a subband CQI mode, the basis for selecting a subband to be reported should be clarified. In case of CS/CB, the basis for selecting a subband may be quality (for example, SINR) of the signals received from the serving cell. In other words, the user equipment should select M subbands having the greatest receiving SINR of the serving cell and report CQI and PMI at the corresponding subband and the corresponding subband index. In this case, how to control the signals from the other cells within the CoMP set should be considered.

Scheme 1) in case of the user equipment having the cell 1 as the serving cell, it is considered that the cell 2 performs beam avoidance for the corresponding user equipment. A scheme for calculating receiving SINR of the user equipment on the assumption that the signal from the cell 2 is regarded as interference regardless of the fact that the cell 2 actually performs beam avoidance will be suggested. Assuming that strength of the signal from the cell 1 is $S_1$ and strength of the signal from the cell 2 is $S_2$, the receiving SINR is as expressed by the following Equation 15.

$$SINR \approx \frac{S_1}{N+S_2} \qquad \text{[Equation 15]}$$

In this case, it is assumed that N represents noise and $S_2$ is a main interference term.

The user equipment may obtain receiving SINR per subband through the following Equation 16 in the same manner as the Equation 15.

$$SINR_i \approx \frac{S_{i,1}}{N+S_{i,2}} \qquad \text{[Equation 16]}$$

In this case, $SINR_i$ represents receiving SINR at the subband i, $S_{i,1}$ and $S_{i,2}$ respectively represent strengths of signals received from the cells 1 and 2 at the subband i. N represents noise and/or interference.

M subbands having the best receiving SINR per subband, which is calculated by the Equation 16, are selected, and CQI/PMI at the corresponding M subbands and subband index are reported. In this case, it is not required to report PMI of a neighboring cell.

Scheme 2) The user equipment may assume that there is no interference from a signal of a neighboring cell as a cell within a CoMP set performs beam avoidance. In other words, on the assumption that a specific PMI of a neighboring cell is used, CQI subband and CQI of the serving cell may be calculated. The signal of the cell 2 is transmitted orthogonally to the beam of the signal of the cell 1 by cooperation of the two cells, it does not act as interference for the corresponding user equipment. At this time, receiving SINR per subband may be calculated as follows.

$$SINR_i \approx \frac{S_{i,1}}{N} \qquad \text{[Equation 17]}$$

In this case, $SINR_i$ represents receiving SINR at the subband i, $S_{i,1}$ represents strength of the signal received from the cell 1. N represents noise and/or interference.

As described above, the user equipment calculates receiving SINR per subband on the assumption that there is no interference from the cells within the CoMP set, selects M subbands having the best receiving SINR, and reports the corresponding subband index and CQI/PMI. At this time, PMI desired to be used by a neighboring cell and PMI desired not to be used by the neighboring cell may be reported together with neighboring cell ID.

Scheme 3) is an intermediate scheme of the scheme 1 and the scheme 2. Even in case that the cells within the CoMP set perform interference avoidance of the serving cell through beamforming, interference is not removed completely depending on the channel status, PMI actually used by the neighboring cell, etc. Accordingly, some signals from the cells within the CoMP set may act as interference. In this case, SINR per subband may be calculated as follows.

$$SINR_i \approx \frac{S_{i,1}}{N + \alpha S_{i,2}} \quad \text{[Equation 18]}$$

In this case, $SINR_i$ represents receiving SINR at the subband i, $S_{i,1}$ and $S_{i,2}$ respectively represent strength of the signals received from the cells 1 and 2 at the subband i. N represents noise and/or interference. $\alpha$ is a random real number that satisfies $0 \leq \alpha \leq 1$, and means a rate of actual interference, which occurs without being removed fully after a precoding and receiving processing procedure, in the interference power from the neighboring cell. The receiving SINR per subband may be calculated, M subbands having the best receiving SINR may be selected, and the corresponding subband index and CQI/PMI may be reported. At this time, PMI desired to be used by the neighboring cell and PMI desired not to be used by the neighboring cell may be reported together with neighboring cell ID.

It has been described that the user equipment obtains and reports CQI and PMI by assuming PMI of the neighboring cell. Unlike the aforementioned description, the base station may report PMI of the other cell within the CoMP set to the user equipment, and the user equipment may select CQI and preferred PMI by considering the PMI of the other cell. To this end, cell ID of the neighboring cell, which performs CS/CB, and a PMI value of the corresponding cell should be signaled from the base station to the user equipment through the PDCCH or the upper layer signal. The user equipment selects a transmission beam for the serving cell to minimize interference from the neighboring cell by assuming the PMI of the neighboring cell, which is received from the base station. In other words, when calculating PMI/CQI of the serving cell, PMI orthogonal to the PMI used by the neighboring cell is selected, and when the selected PMI is used, the CQI is calculated and reported. The PMI to be used by the other cell within the CoMP set notified to the user equipment should be shared between the cells within the CoMP set through a backhaul. If the base station notifies the user equipment of the PMI to be used by the neighboring cell, since the user equipment may predict interference of the neighboring cell, it may calculate more exact CQI and PMI. As a result, if PMI to be used by the neighboring cell is transmitted from the base station, the user equipment may set a target block error rate lower than that of the case where the PMI to be used by the neighboring cell is not transmitted from the base station in calculating CQI and PMI. This scheme may be used for all CQI report modes.

Embodiment 4: Per-Cell Reporting

In this embodiment, a per-cell reporting scheme, which may be used for a CoMP scheme maximizing gain through dynamic switching among the schemes such as DCS, JT, and CS/CB, more specifically a method for selecting a subband will be described.

Figure 13:
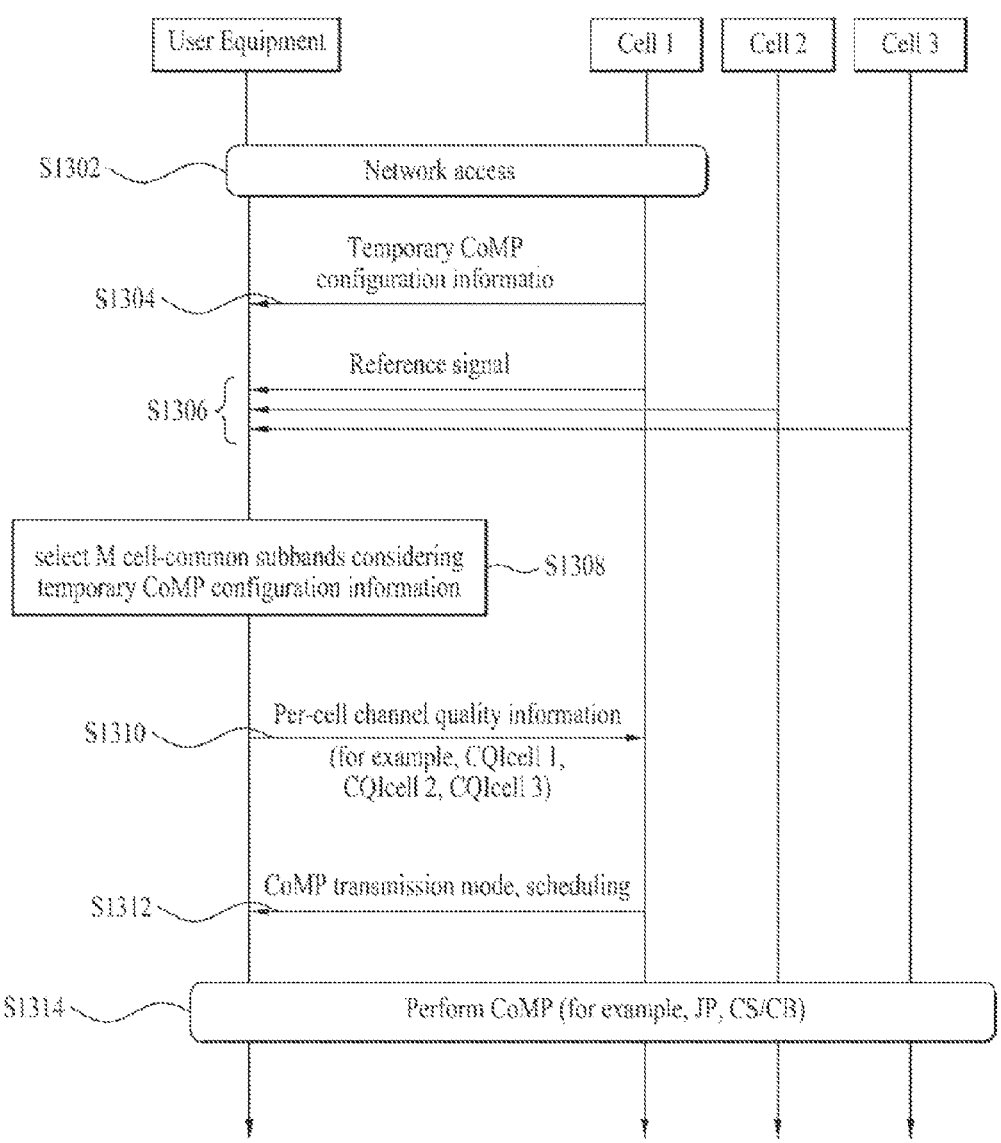

FIGS. 13 and 14 are diagrams illustrating a per-cell reporting scheme according to the embodiment of the present invention. FIG. 13 illustrates a flow chart that performs a per-cell reporting scheme, and FIG. 14 illustrates a scheme for selecting and reporting M cell-common subbands by considering CoMP configuration (M is an integer greater than 1). This embodiment assumes that three transmission points take part in CoMP like FIG. 11. In the drawing, the cell may be replaced with the transmission point such as a base station, an access point and a relay.

Referring to FIG. 13, the user equipment performs network access for the cell 1 (S1302). In the later steps, the cell 1 acts as the serving cell. The cell 1 transmits temporary CoMP configuration (or transmission mode) information to the user equipment (S1304). In the subband CQI mode, the basis for selecting a subband should be matched with CoMP configuration (or transmission mode) of the base station to maximize transmission efficiency. Accordingly, the base station may previously notify the user equipment of CoMP configuration (or transmission mode) preferred by the base station, whereby the user equipment may obtain channel information and select the subband. The temporary CoMP configuration (or transmission mode) information is preferred (or referred) by the serving cell, may be different from CoMP configuration (transmission mode) actually used for data transmission by the cell, and is used to assist subband selection of the user equipment during a feedback process. For example, the temporary CoMP configuration information may include at least one of CoMP cooperative/measurement set, CoMP action indication information (for example, data transmission point/beam avoidance point indication information) of the transmission point, and CoMP mode indication information (for example, DCS, JP, and CS/CB). Preferably, the temporary CoMP configuration information may include data transmission point/beam avoidance point indication information and/or CoMP mode (for example, DCS, JP and CS/CB).

In the mean time, the CoMP cooperative/measurement set may be transmitted through separate signaling (for example, RRC signaling) unlike the step S1304. Also, the CoMP action indication information (for example, data transmission point/beam avoidance point indication information) of the transmission point may indicate whether the corresponding cell will serve as a data transmission point or beam avoidance point through a CoMP action flag field for signaling (RRC signaling) indicating the CoMP cooperative/measurement set or signaling (for example, RRC signaling) requiring CQI feedback. The flag field may be defined per cell, or one flag field may be defined in a bitmap type for all the cells within the CoMP set. A value of a flag field for each cell may be configured by 1-bit information or information of a plurality of bits. If the value of the flag field for the corresponding cell is configured by 1-bit information, the 1-bit information may indicate whether the corresponding cell will serve as the data transmission point or beam avoidance point. Meanwhile, if the value of the flag field for the corresponding cell is configured by information of a plurality of bits, the information of a plurality of bits may indicate whether the corresponding cell will serve as the data transmission point, beam avoidance point, or non-coordinated transmission point.

If it is previously set/scheduled that the service cell (for example, cell 1) is always set to the data transmission point, the CoMP action flag for the cell 1 may not exist. In this case, the flag field (for example, 1-bit flag field) may be set to the cell 2 and the cell 3 only added to the CoMP cooperative/measurement set, thereby indicating whether the corresponding cell serves as the data transmission point or beam avoidance point.

Afterwards, the user equipment generates measurement and channel quality information on the basis of a random frequency/time interval by using a reference signals received from each cell (S1306). The measurement and channel quality information may be generated in a subband unit.

Channel quality (or spectrum efficiency) (for example, CQI) may be obtained using a signal to interference and noise ratio (SINR) of a channel, a carrier to interference and noise ratio (CINR), a bit error rate (BER), a frame error rate (FER), and a value obtained by converting the SINR, the CINR, the BER and the FER into transmission data.

Subsequently, the user equipment selects M cell-common subbands by considering the temporary CoMP configuration information (S1308). The M cell-common subbands are selected for a receiving signal of a preferred cell on the basis of the temporary CoMP configuration information, and whether a receiving signal of what cell is used to select the cell-common subbands is determined adaptively using the temporary CoMP configuration information. For example, for the cells set to the transmission points, the signals of the corresponding cells may be regarded as effective signals during the procedure of selecting subbands. For the cells set to the beam avoidance points, the signals of the corresponding cells may be regarded as noise and/or interference. The M subbands are preferred by the user equipment or the base station, and for example, may be selected in the order of channel quality.

If the temporary CoMP configuration information includes CoMP mode indication information (for example, DCS, JP, CS/CB), channel information combined to measure the M cell-common subbands may be calculated with reference to the Embodiments 1 to 3. If the temporary CoMP configuration information includes CoMP action indication information (for example, data transmission point/beam avoidance point), selection of the M subbands will later be described in more detail with reference to FIG. 14.

Afterwards, the user equipment transmits per-cell channel quality information (for example, $CQI_{cell\ 1}$, $CQI_{cell\ 2}$, $CQI_{cell\ 3}$) to the serving cell (S1310). It is noted that the M subbands are selected at step S1308 equally for the CoMP cells but channel quality information reported to the serving cell is calculated per cell. For example, if the subband 5 is selected as the cell-common subband at the step S1308, a channel quality value used to the cell-common subband may be a value obtained by combining measurement values of the cell 1, the cell 2 and the cell 3 with one another. However, channel quality information on the subband 5 reported by the user equipment may be $CQI_{cell\ 1\_subband\ 5}$, $CQI_{cell\ 2\_subband\ 5}$, and $CQI_{cell\ 3\_subband\ 5}$ calculated per cell. In other words, although the combined channel quality information is used for selection of the subbands, channel quality information calculated independently for each cell is used for reporting of the subbands.

Afterwards, the serving cell transmits a CoMP transmission mode and scheduling information to the user equipment on the basis of the reported channel quality information (S1312), and therefore the cells and the user equipment may perform CoMP (S1314).

The step (S1308) of selecting subbands and the step (S1310) of reporting per-cell channel quality information will be described in more detail with reference to FIG. 14. It is assumed that the M subbands are selected in the order of channel quality (or spectrum efficiency) (for example, CQI) (Best-M scheme).

Referring to FIG. 14, the cell-common best 3-subbands considering the temporary CoMP configuration information are the subband 1, the subband 4 and the subband 8 (S1308). In this case, selection (S1308) of the cell-common subbands and reporting (S1310) of per-cell channel information may be performed as follows in accordance with the CoMP configuration (for example, CoMP operation of the cells).

Case 1: data transmission point-cell 1 and beam avoidance point-cell 2 and cell 3
  The subband optimized for receiving the signal of the cell 1 is selected as the cell-common best M-subband(s).
Case 2: data transmission point-cell 1 and cell 2; beam avoidance point-cell 3
  The subband optimized for receiving the signals of the cell 1 and the cell 2 is selected as the cell-common best M-subband(s).
Case 3: data transmission point-cell 1 to cell 3
  The subband optimized for receiving the signals of the cell 1 to the cell 3 is selected as the cell-common best M-subband(s).

After the cell-common subbands are selected (S1308), per-cell channel quality information reporting is performed as follows (S1310).
  Reporting of the cell 1: channel quality values $a_1$, $a_4$, $a_8$
  Reporting of the cell 2: channel quality values $b_1$, $b_4$, $b_8$
  Reporting of the cell 3: channel quality values $c_1$, $c_4$, $c_8$ Although the aforementioned example illustrates that all the cells report per-cell channel quality information for the cell-common subbands, per-cell channel quality reporting may be varied depending on whether the corresponding cell is the data transmission point or the beam avoidance point. For example, in case of the cell indicated as the beam avoidance point, the channel information used for channel quality information reporting may be for the cell-specific subband not the cell-common subband, wherein the cell-specific subband is determined considering the corresponding cell only.

Hereinafter, the embodiment of the present invention will be described in more detail on the basis of SINR as CQI or a conversion value of the SINR.

In the per-cell CQI report mode, the user equipment may individually report to the serving cell PMI maximizing receiving SINR and measurement SINR of the signal transmitted to the corresponding PMI for all the cells within the CoMP cooperative/measurement set. If the CoMP cooperative/measurement set is configured by the cell 1, the cell 2, and the cell 3, measurement strength of the signal received from the cell k through the subband i may be represented by $S_{i,k}$, and an interference signal and receiving noise signal from the cell other than the cooperative set may be represented by N. In this case, measurement SINR for the kth cell is expressed as follows at the subband i.

$$SINR_{i,k} \approx \frac{S_{i,k}}{N} \quad \text{[Equation 19]}$$

If the user equipment reports $SINR_{i,k}$ and PMI supporting $SINR_{i,k}$ to all the cells within the cooperative set through the per-cell CQI report mode, the base station may calculate estimated SINR in accordance with the CoMP scheme, which supports DL packet during scheduling, determine a size of a packet suitable for the calculated SINR, and transmit the determined packet.

For another example, if the cell 1 is the serving cell and the CoMP mode is CS/CB, estimated SINR at the subband i may be calculated as follows.

$$SINR_i \approx \frac{SINR_{i,1}}{1 + \alpha \cdot SINR_{i,2} + \alpha \cdot SINR_{i,3}} = \frac{S_{i,1}}{N + \alpha \cdot S_{i,2} + \alpha \cdot S_{i,3}} \quad \text{[Equation 20]}$$

In this case, α is a random real number that satisfies 0≤α≤1, and means a rate of actual interference, which occurs without being removed fully after a precoding and receiving processing procedure, in the interference power from the neighboring cell.

For another example, if the CoMP mode is JT, estimated SINR at the subband i may be calculated as follows.

$$SINR_i \approx SINR_{i,1} + SINR_{i,2} + SINR_{i,3} = \frac{S_{i,1} + S_{i,2} + S_{i,3}}{N} \quad \text{[Equation 21]}$$

For another example, if the CoMP mode is a hybrid mode of JT and CS/CB, the JT scheme may be used for the cell 1 and the cell 2, and the CS/CB scheme may be used for the cell 3. In this case, estimated SINR at the subband i may be calculated as follows.

[Equation 22]

If the cell 1, the cell 2 and the cell 3 are set to the data transmission points, the user equipment may calculate SINR of the subband and determine the optimized subband as expressed by the Equation 21.

For example, if the CoMP cooperative/measurement set is configured by three cells, the cell 1, the cell 2 and the cell 3, the cell 1 may be set to the data transmission point and the cell 2 and the cell 3 may be set to the beam avoidance points. In this case, the user equipment may calculate SINR of the subband and determine the optimized subband as expressed by the Equation 20. If the cell 1, the cell 2 and the cell 3 are all set to the data transmission points, the user equipment may calculate SINR of the subband and determine the optimized subband as expressed by the Equation 21. If the cell 1 and the cell 2 are set to the data transmission points and the cell 3 is set to the beam avoidance point, the user equipment may calculate SINR of the subband and determine the optimized subband as expressed by the Equation 22. The Equations 20 to 22 are used to calculate combined estimation SINR for selecting the optimized subband. On the other hand, receiving estimation SINR for CQI which is actually fed back is calculated per cell by using the Equation 19 and then fed back. The serving cell (or base station) that has received individual channel quality information of each cell may estimate channel quality (for example, SINR) based on the CoMP scheme in accordance with the Equations 20 to 22 and may dynamically switch the CoMP scheme through the estimated channel quality.

Figure 15:
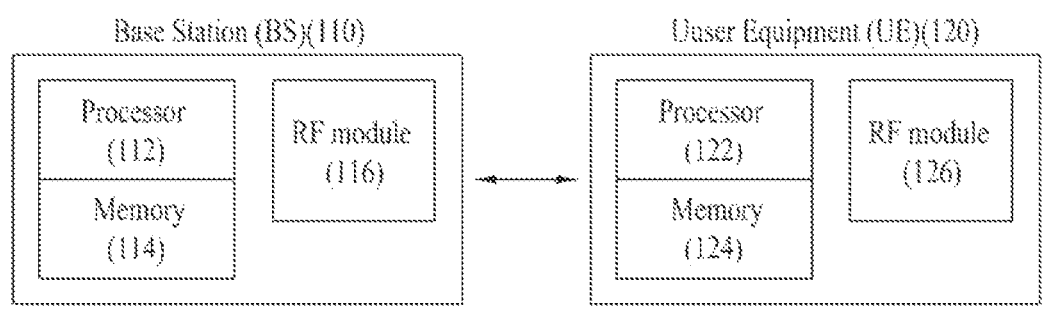
FIG. 15 is a block diagram illustrating a base station and a user equipment, which can be applied to the present invention.

FIG. 15 illustrates a base station and a user equipment that can be applied to the embodiment of the present invention.

Referring to FIG. 15, a wireless communication system includes a base station (BS) 110 and a user equipment (UE) 120. In a downlink, a transmitter is a part of the base station 110, and a receiver is a part of the user equipment 120. In an uplink, the transmitter is a part of the user equipment 120, and the receiver is a part of the base station 110. The base station 110 includes a processor 112, a memory 114, and a radio frequency (RF) unit 116. The processor 112 may be configured to implement procedures and/or methods suggested in the present invention. The memory 114 is connected with the processor 112 and stores various kinds of information related to the operation of the processor 112. The RF unit 116 is connected with the processor 112 and transmits and/or receives a radio signal. The user equipment 120 includes a processor 122, a memory 124, and a radio frequency (RF) unit 126. The processor 122 may be configured to implement procedures and/or methods suggested in the present invention. The memory 124 is connected with the processor 122 and stores various kinds of information related to the operation of the processor 122. The RF unit 126 is connected with the processor 122 and transmits and/or receives a radio signal. The base station 110 and/or the user equipment 120 may have a single antenna or multiple antennas. Also, although not shown, the user equipment 120 may further include at least one of a power management module, a battery, a display, a keypad, SIM card (option), a speaker, and a microphone.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the base station and the user equipment. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point. Also, the user equipment may be replaced with terms such as mobile station (MS) and mobile subscriber station (MSS).

The embodiments according to the present invention may be implemented by various means, for example, hardware, firmware, software, or their combination. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention may be applied to a wireless communication system. In more detail, the present invention may be applied to a method for transmitting channel quality information in a wireless communication system and an apparatus for the same.

The invention claimed is:

1. A method for transmitting channel quality information from a user equipment in a wireless communication system that supports coordinated multiple point transmission and reception (CoMP), the method comprising:
receiving CoMP configuration information from a serving transmission point,
wherein the CoMP configuration information indicates which transmission point is a data transmission point or a beam avoidance point among a plurality of transmission points belonging to a first CoMP set comprising one or more data transmission points and one or more beam avoidance points;
receiving first downlink signals from the one or more data transmission points belonging to the first CoMP set and second downlink signals from the one or more beam avoidance points;
generating first channel quality information by calculating combined estimation SINR (Signal to Interference and Noise Ratio) per downlink subband among N downlink subbands,
wherein the combined estimation SINR per downlink subband is calculated by regarding the first downlink signals as effective signals, the second downlink signals as interference signals and received signals from cells other than the plurality of transmission points belonging to the first CoMP set as noise signals;
selecting M downlink subbands (N>M>1, M, N are integers) among N downlink subbands according to the first channel quality information; and
transmitting second channel quality information of each transmission point belonging to the first CoMP set on the M downlink subbands to the serving transmission point respectively,
wherein the second channel quality information is calculated by using measurement strengths of the first or second downlink signal received from each transmission point belonging to the first CoMP set on the M downlink subbands and the noise signals, the noise signals only including received signals from cells other than the plurality of transmission points belonging to the first CoMP set.

2. The method according to claim 1, wherein the CoMP configuration information includes CoMP mode information indicating dynamic cell selection (DCS), joint processing (JP), or cooperative scheduling/cooperative beamforming (CS/CB), and the M downlink subbands are selected considering the CoMP mode information.

3. The method according to claim 1, wherein the CoMP configuration information includes a flag field indicating whether the transmission point is the data transmission point or the beam avoidance point.

4. A user equipment configured to transmit channel quality information in a wireless communication system that supports coordinated multiple point transmission and reception (CoMP), the user equipment comprising:
a radio frequency (RF) unit; and
a processor configured to control the RF unit,
wherein the processor is configured to:
receive CoMP configuration information from a serving transmission point,
wherein the CoMP configuration information indicates which transmission point is a data transmission point or a beam avoidance point, among a plurality of transmission points belonging to a first CoMP set comprising one or more data transmission points and one or more beam avoidance points,
receive first downlink signals from the one or more data transmission points belonging to the first CoMP set and second downlink signals from the one or more beam avoidance points,
generate first channel quality information by calculating combined estimation SINR (Signal to Interference and Noise Ratio) per downlink subband among N downlink subbands,
wherein the combined estimation SINR per downlink subband is calculated by regarding the first downlink signals as effective signals, the second downlink signals as interference signals and received signals from cells other than the plurality of transmission points belonging to the first CoMP set as noise signals,
select M downlink subbands (N>M≥1, M, N are integers) among N downlink subbands according to the first channel quality information, and
transmit second channel quality information of each transmission point belonging to the first CoMP set on the M downlink subbands to the serving transmission point respectively,
wherein the second channel quality information is calculated by using measurement strengths of the first or second downlink signal received from each transmission point belonging to the first CoMP set on the M downlink subbands and the noise signals, the noise signals only including received signals from cells other than the plurality of transmission points belonging to the first CoMP set.

5. The user equipment according to claim 4, wherein the CoMP configuration information includes CoMP mode information indicating dynamic cell selection (DCS), joint processing (JP), or cooperative scheduling/cooperative beamforming (CS/CB), and the M downlink subbands are selected considering the CoMP mode information.

6. The user equipment according to claim 4, wherein the CoMP configuration information includes a flag field indicating whether the transmission point is the data transmission point or the beam avoidance point.

* * * * *